(12) United States Patent
Wambaugh (10) Patent No.: US 10,100,528 B2
(45) Date of Patent: Oct. 16, 2018

(54) FIBER POLYMER TRIM (71) Applicant: CERTAINTEED GYPSUM AND CEILING MANUFACTURING, INC, Malvern, PA (US)

(72) Inventor: Douglas J. Wambaugh, Bend, OR (US)

(73) Assignee: CERTAINTEED GYPSUM AND CEILING MANUFACTURING, INC., Malvern, PA (US)

(*) Notice: Subject to any disclaimer, the term of this patent is extended or adjusted under 35 U.S.C. 154(b) by 56 days.

(21) Appl. No.: 15/246,377

(22) Filed: Aug. 24, 2016

(65) Prior Publication Data
US 2016/0362896 A1 Dec. 15, 2016

Related U.S. Application Data (60) Division of application No. 13/476,628, filed on May 21, 2012, now Pat. No. 9,446,546, which is a
(Continued)

(51) Int. Cl.
| E04F 13/00 | (2006.01) |
| E04F 13/06 | (2006.01) |
| B29C 47/00 | (2006.01) |
| B29C 47/04 | (2006.01) |
| B29C 47/10 | (2006.01) |
| B29B 7/34 | (2006.01) |
| B29K 55/02 | (2006.01) |
| B29K 67/00 | (2006.01) |
| B29L 31/10 | (2006.01) |

(52) U.S. Cl.
CPC ............ *E04F 13/068* (2013.01); *B29C 47/00* (2013.01); *B29C 47/0004* (2013.01); *B29C 47/04* (2013.01); *B29C 47/1045* (2013.01); *B29B 7/34* (2013.01); *B29C 47/003* (2013.01); *B29C 47/0066* (2013.01); *B29K 2055/02* (2013.01); *B29K 2067/003* (2013.01); *B29K 2223/065* (2013.01); *B29L 2031/10* (2013.01); *E04F 2013/063* (2013.01)

(58) Field of Classification Search
CPC ...... E04F 13/075; E04F 13/073; E04F 13/068
USPC .................................................. 52/255, 261
See application file for complete search history.

(56) References Cited

U.S. PATENT DOCUMENTS

| 658,386 A | 9/1900 | Mitchell |
| 2,234,701 A | 3/1941 | Lyman |
(Continued)

*Primary Examiner* — Christina Johnson
*Assistant Examiner* — Xue Liu
(74) *Attorney, Agent, or Firm* — Abel Law Group, LLP; Alexander H. Plache (57) ABSTRACT A corner trim material that is made of a material that will bond with current industry mastics such as all purpose joint compounds, resists impact, resists abrasion, and readily accepts common coatings such as drywall mud, texture and paints. The surface of this material generally does not need to be covered by any secondary fiber based material such as paper to improve bonding or coating on the inside or outside. The material generally consists of a polymer mixed with a fibrous material like pulp or glass fiber. A corner trim piece can be directly extruded from the mix. The corner trim piece can have a center hinge, can be bullnose, and the flanges can optionally have holes or optionally be coated with adhesive.

8 Claims, 6 Drawing Sheets

Related U.S. Application Data continuation of application No. 12/569,188, filed on Sep. 29, 2009, now abandoned.

(60) Provisional application No. 61/194,869, filed on Oct. 1, 2008.

(56) References Cited

U.S. PATENT DOCUMENTS

| | | |
|---|---|---|
| 2,643,423 A | 6/1953 | Brendel |
| 2,796,641 A | 6/1957 | Wollaeger |
| 2,851,741 A | 9/1958 | Stemples |
| 2,904,856 A | 9/1959 | Robinson |
| 2,969,616 A | 1/1961 | Gustafson |
| 3,090,087 A | 5/1963 | Miller |
| 3,109,207 A | 11/1963 | Cooper |
| 3,255,561 A | 6/1966 | Cable |
| 3,307,313 A | 3/1967 | Tatum |
| 3,391,509 A | 7/1968 | Fruman |
| 3,765,138 A | 10/1973 | Bentle |
| 4,792,473 A | 12/1988 | Vitale |
| 4,876,837 A | 10/1989 | Kelly |
| 5,131,198 A | 7/1992 | Ritchie |
| 5,246,775 A | 9/1993 | Loscuito |
| 5,314,584 A | 5/1994 | Grinnell |
| 5,328,567 A | 7/1994 | Kinsley |
| 5,442,886 A | 8/1995 | Iacobelli |
| 5,466,336 A | 11/1995 | Kinsley |
| 5,498,314 A | 3/1996 | Kinsley, Jr. |
| 5,604,001 A | 2/1997 | Schold |
| 5,613,335 A | 3/1997 | Rennich |
| 5,711,124 A | 1/1998 | Stough |
| 5,759,680 A * | 6/1998 | Brooks ............... B29B 17/0026 428/326 |
| 5,780,369 A | 7/1998 | Allison |
| 5,800,675 A | 9/1998 | Kinsley, Jr. |
| 5,824,191 A | 10/1998 | Kinsley, Jr. |
| 5,836,122 A | 11/1998 | Rennich |
| 5,904,016 A | 5/1999 | Koenig |
| 6,001,200 A | 12/1999 | Hibler |
| 6,073,406 A | 6/2000 | Kearney |
| 6,119,420 A | 9/2000 | Koenig, Jr. |
| 6,148,573 A * | 11/2000 | Smythe, Jr. ............ B32B 29/00 52/255 |
| 6,180,037 B1 | 1/2001 | Andersen |
| 6,226,957 B1 | 5/2001 | Stough |
| 6,295,776 B1 | 10/2001 | Kunz |
| 6,363,673 B1 | 4/2002 | Robertson |
| 6,413,606 B1 | 7/2002 | Calderon |
| 6,447,872 B1 | 9/2002 | Larson |
| 6,539,680 B2 | 4/2003 | Kunz |
| 6,571,520 B2 | 6/2003 | Koenig |
| 6,615,557 B2 | 9/2003 | Smythe, Jr. |
| 6,655,101 B2 | 12/2003 | Harel |
| 6,691,476 B1 | 2/2004 | Kunz |
| 6,691,477 B2 * | 2/2004 | Koenig, Jr. ............ E04F 13/06 52/255 |
| 6,722,092 B2 | 4/2004 | Kunz |
| 6,779,313 B2 | 8/2004 | Smythe, Jr. |
| 7,013,610 B2 | 3/2006 | Kunz |
| 7,036,284 B1 | 5/2006 | Larson |
| 7,214,434 B2 | 5/2007 | Dalgleish |
| 7,383,668 B1 * | 6/2008 | Kunz ................ B29C 47/0019 52/255 |
| 2002/0073639 A1 | 6/2002 | Kunz |
| 2002/0083665 A1 | 7/2002 | Razetto |
| 2003/0056453 A1 | 3/2003 | Young |
| 2003/0089058 A1 | 5/2003 | Kunz |
| 2003/0131546 A1 | 7/2003 | Kunz |
| 2003/0213196 A1 | 11/2003 | Harel |
| 2004/0006938 A1 | 1/2004 | Schiffmann |
| 2004/0093816 A1 | 5/2004 | Smythe |
| 2006/0059809 A1 | 3/2006 | Smythe |
| 2006/0059810 A1 | 3/2006 | Budzik |
| 2006/0101746 A1 | 5/2006 | Smythe |
| 2007/0107336 A1 | 5/2007 | Conboy |

* cited by examiner

FIG 6

FIBER POLYMER TRIM

CROSS-REFERENCE TO RELATED APPLICATIONS

This is a divisional of application Ser. No. 13/476,628, entitled "FIBER POLYMER TRIM" by Douglas J. WAMBAUGH, filed May 21, 2012, which is a continuation of application Ser. No. 12/569,188, entitled "FIBER POLYMER TRIM" by Douglas J. WAMBAUGH, filed Sep. 29, 2009. This application is related to and claims priority from U.S. Provisional Patent Application No. 61/194,869, entitled "FIBER POLYMER TRIM" by Douglas J. WAMBAUGH, filed Oct. 1, 2008. All of which are assigned to the current assignee hereof and incorporated herein by reference in their entireties.

BACKGROUND

Field of the Invention

The present invention relates generally to the field of drywall corner trim and more particularly to a fiber polymer trim.

Description of the Art

Various types of drywall corner trim finishing materials are available for use today and are well known in the art. Some have been around for many years. The simplest of these materials is the metal bead. This is a completely metal bead that is formed such that it can be mechanically screwed, nailed, stapled, crimped or otherwise mechanically attached to the wall and enough joint compound is used to cover the attaching hardware and blend it into a smooth transition to the flat wall. Another type of metal material is paper faced metal. The paper on this material aids in bonding mud, texture and paint to the finished corner. This material may be intended to be mudded onto the corner without using screws but it is subject to the same problems as metal bead. The metal material of this product does not bond with mud and is easily damaged by moderate impacts or even slight frame shifting both of which cause denting, cracks and delimitation along the corner.

Another family of products are vinyl or other plastic pieces that are sometimes covered with paper. These products are subject to the same problems as metal beads because, like metal, they do not take coatings well. Mud, texture and paints do not adhere to the surface of these materials. They do not dent like metal, but when impacted the mud, texture and paints will flake off the surface because of a poor bond. As stated, paper layers are sometimes added to the construction, as with metal, to try to improve on these problems.

Finally, there is a paper, polymer, paper lamination product family. These products are the highest quality of their type and functionally have the best characteristics. They are rigid yet flexible and impact resistant. They bond very well with joint compound forming a structural corner. The outer and inner layers are covered with fibrous materials, usually paper, that bond very well with mud, textures, paints and the like. They can also be shaped and tapered and generally require very little mud to finish out However, what is badly needed is a corner trim product line made from a material that is rigid like metal and impact resistant like plastic, while also being abrasion resistant. It should have all the beneficial surface properties of a fiber layer that will bond well with common joint compounds, textures, paints or other coatings common in the industry and form a structural bond to the sheet rock. It should be able to be mudded, glued or nailed, screwed or stapled to any corner during installation.

SUMMARY OF THE INVENTION

The present invention relates to a corner trim material that is made of a material that will bond with current industry mastics such as all purpose joint compounds, resists impact, resists abrasion, and readily accepts common coatings such as drywall mud, texture and paints. The surface of this material generally does not need to be covered by any secondary fiber based material such as paper to improve bonding or coating on the inside or outside. The material generally consists of a polymer mixed with a fibrous material like pulp or glass fiber. A corner trim piece can be directly extruded from the mix. The corner trim piece can have a center hinge, can be bullnose, and the flanges can optionally have holes or optionally be coated with adhesive.

DESCRIPTION OF THE FIGURES

Attention is now drawn to several illustrations of the features of the present invention.

Several illustrations and drawings have been presented to aid in understanding the present invention. The scope of the present invention is not limited to what is shown in the Figures.

DESCRIPTION OF THE INVENTION

The present invention relates generally to the field of drywall corner trim products and more particularly to a corner trim material that is made of a material that will bond with current industry mastics such as all purpose joint compounds, will resist impact, will resist abrasion, and will readily accept common coatings such as drywall mud, texture and paints. The surface of this material generally does not need to be covered by any secondary fiber based material such as paper to improve bonding or coating on the inside or outside.

More particularly, the present invention relates to a corner trim product made of a material that is inexpensive, commonly available, incorporates the beneficial characteristics of a polymer such as strength and flexibility which yields impact resistance, and an ability to flex or hinge, the beneficial characteristics of paper exterior, such as bonding well with mastics commonly used in the industry, and being easily coated with textures and paints, and strength approaching that of metal. It can also withstand abrasion from various finishing processes such as sanding.

Materials that have these characteristics can be a blend of, or separate components of, wood, or pulp fibers, fiber glass and a polymer such as High Density Polyethylene (HDPE), Polyethylene Terephthalate (PET) or Acrylonitrile Butadiene Styrene (ABS). Any suitable plastic or polymer is within the scope of the present invention. Each of these separate materials are already common for use as wood alternative materials for decking or other outside construction such as picnic benches and the like. Making a drywall corner trim out a mixture of wood and a polymer is one embodiment of the present invention.

This material can be extruded into any profiled shape for various corner trim product characteristics. Some of these characteristics can include two adjacent flanges attached at a common edge forming the apex of some predetermined angle between said flanges, like on current outside 90 corner trims known in the art. Alternatively, the flanges can be joined by a large radius bull nose running longitudinally along the center line of the trim, like bullnose products known in the art. Each flange can have an inside surface for mating to the sheet rocked wall and an outside surface for feathering with mud and/or finishing with texture, paints or other common wall finishes. The inside and outside surface of each flange can be parallel forming a flange of constant thickness, be tapered from the apex of a solid inside or outside 90 degree corner trim product, or be tapered from the end of the radius of a Bullnose product to the outside edge of the flange furthest away from the said apex or radius. The apex can be formed by a thin groove running longitudinally along the centerline of the trim piece creating a hinge feature that allows the product to flex to any angle of corner being finished.

A corner trim material made of this material can be manufactured into any shape and can replace all constructions that today's corner trim materials are available in. In particular, it can replace paper faced metal, vinyl, paper-plastic, paper-plastic-paper or any of the other types of corner trim or other bead assembly constructions on the market today with a single composite material product. An optional adhesive layer can be added to the inside (wall side) of this material to create a permanent, strong and fast bond to the corner.

A particular material that includes all these beneficial properties without the negative properties of many existing products is be a blend of fibers or other filler (such as pulp or wood, foaming agents, or absorbent polymers) to make the final material porous so it will accept coatings, and a polymer such as High Density Polyethylene (HDPE) to give the material strength, impact resistance and flexibility.

This mix of materials can be extruded and/or rolled, or otherwise shaped in one or more operations into any profile to match any drywall corner trim shape currently available in the drywall corner trim industry, or a new shape to achieve a particular benefit or function. An optional adhesive layer may added to the inside (or wall side) of the profile to aid in bonding the trim piece onto the drywall corner rapidly and easily.

The materials used in this product are generally common in the building industry but usage is so far limited to decking, railing, trim and other extruded shapes. Sometimes they are used in furniture molding or picnic bench materials or other outside use. Another benefit of this material is that it can often be made completely out of recycled materials. The exact type of polymer, and the exact fiber/filler to attain bonding properties, can be changed get the best property mix and are not limited to current materials or technologies. Any material with these properties is within the scope of the present invention.

Figure 1:
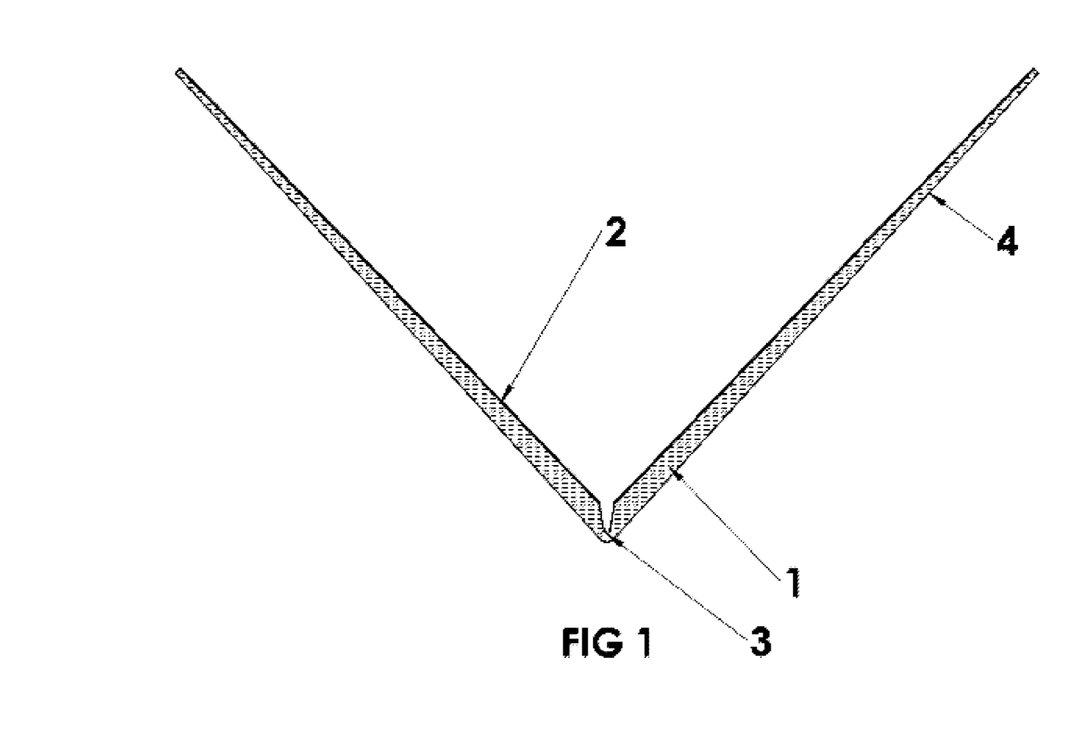
FIG. 1 shows one possible profile of an extruded shape made of this composite material (1) that could be used for covering outside 90 degree corners on a sheet rocked wall.

Turning to FIG. 1 a possible profile of an extruded shape made of this composite material (1) that can be used for covering outside 90 degree corners on a sheet rocked wall can be seen. This profile can include a taper (4) to help minimize the amount of mud required to finish the corner installation in preparation for painting or other cosmetic cover. This profile incorporates a groove (3) running the length of the trim piece which may function as a hinge or flex point. Also shown is an optional adhesive (2) on the inside (wall side) of the corner trim material. If the material naturally adheres to mastics commonly used in the industry such as drywall finishing compound (mud), this adhesive may not be needed.

Figure 2:
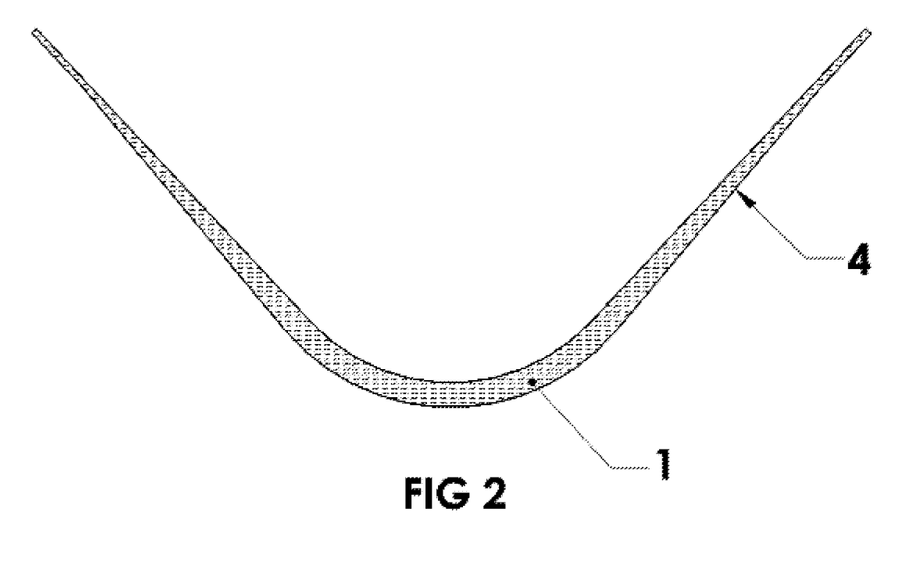
FIG. 2 shows another possible profile of an extruded shape made of this composite material.

FIG. 2 shows another possible profile of an extruded shape made from this composite material (1) that can be used for covering outside, bullnose corners on a sheet rocked wall. This profile can include a taper (4) to minimize the amount of mud required to finish the corner, but the taper is not required. Any bullnose radius, indeed any shape, could be formed to perform the function of finishing drywall corners.

Figure 3:
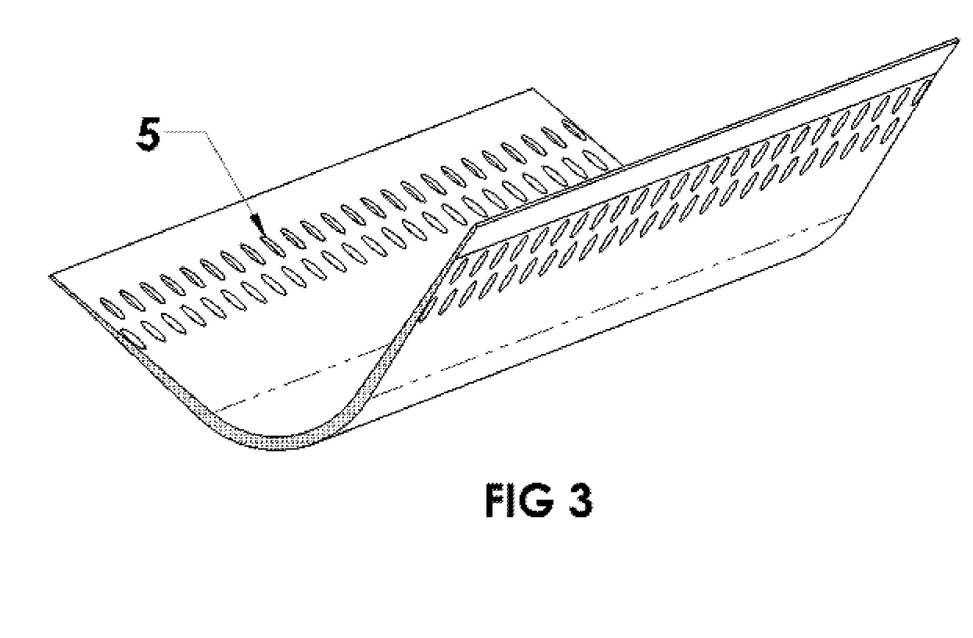
FIG. 3 shows the embodiment of FIG. 2 but with the addition of holes punched through the flange on both sides along the length of the product.

FIG. 3 shows the same product of FIG. 2 but with the addition of holes (5) punched through the flange on both sides along the length of the product.

Figure 4:
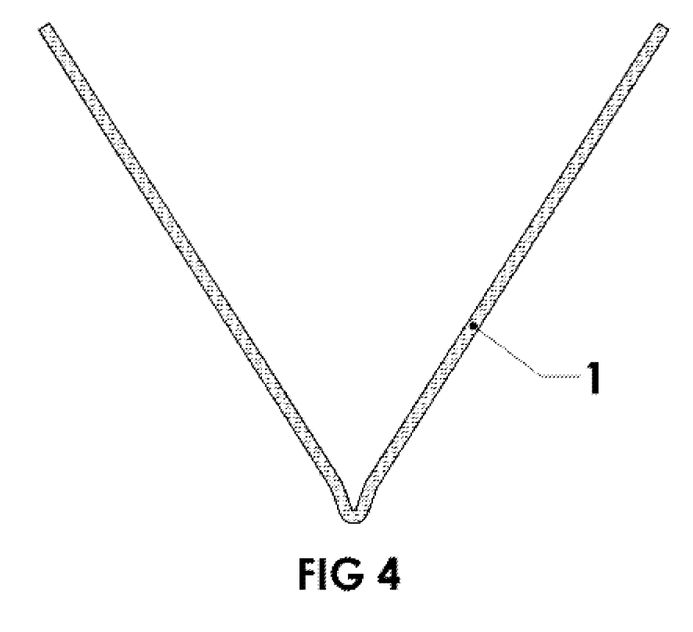
FIG. 4 shows another possible profile of an extruded shape made of this composite material.

FIG. 4 shows another possible profile of an extruded shape made of this composite material (1) that can be used for finishing outside 90 degree corners. This material duplicates metal bead or paper faced metal profiles in shape and function. Holes along both flanges could again be incorporated into the design. Note that FIG. 4 is shown with the product flexed to an angle less an "as-manufactured" angle of 90 degrees.

Figure 5:
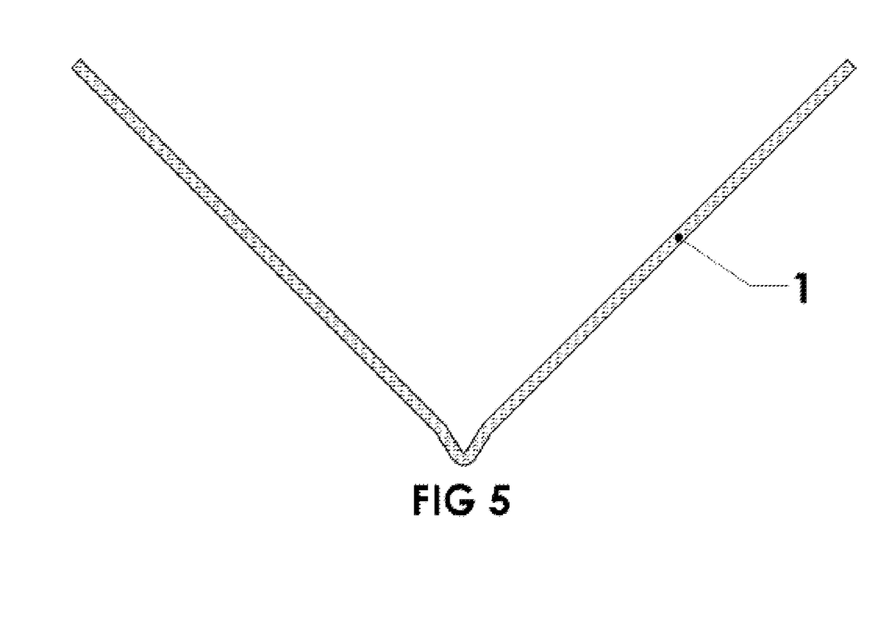
FIG. 5 shows the embodiment of FIG. 4 buy shown at an "as-manufactured" angle of 90 degrees and un-flexed.

FIG. 5 shows the same profile as that described in FIG. 4, but it is shown at an "as manufactured" angle of 90 degrees and is not flexed.

Figure 6:
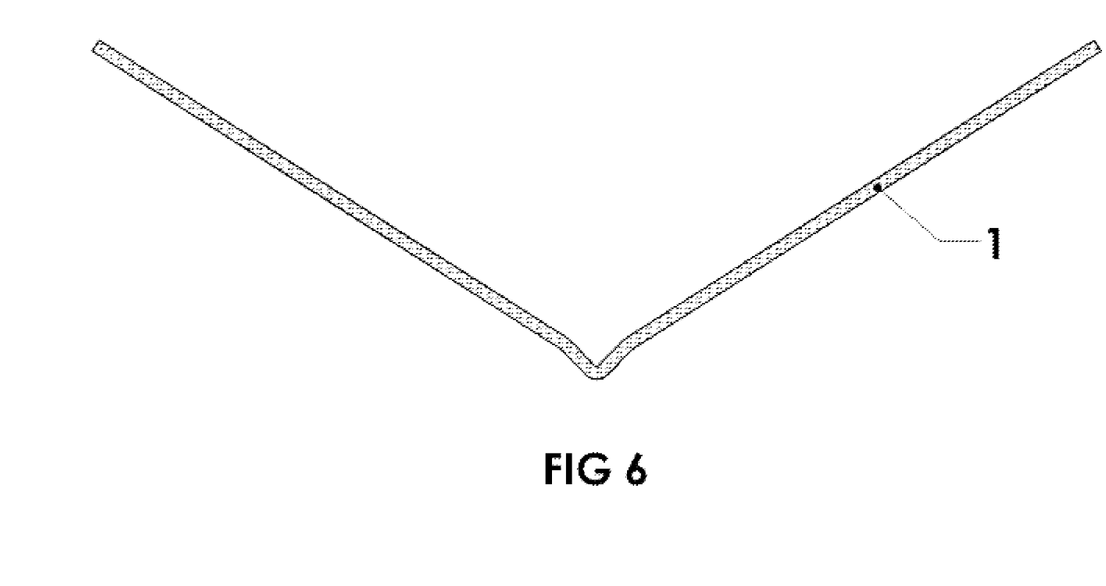
FIG. 6 shows the embodiment of FIG. 4, but it is shown flexed to an angle greater than an "as-manufactured" angle of 90 degrees.

FIG. 6 shows the same profile as that of FIG. 4, but it is shown flexed to an angle greater than an "as manufactured" angle of 90 degrees.

It should be noted that any of the above-described sharp angle nose pieces can be flexible by having a thin hinge extruded at the apex. This hinge can be a thin section of the material, or it can be formed by grooving the material. Pieces with these hinges can generally be bent so that the two flanges make any angle with respect to each other, and they can be bent repeatedly any number of times without fatiguing or cracking.

A method of making the corner pieces of the present invention is to mix and melt the base polymer, and then add the fibrous material to the mix at an elevated temperature sufficient to melt the mix. Pieces can then be directly extruded from the mix. Holes can be optionally made in the flanges during extrusion or later, and adhesive, especially water-activated adhesive can be added to the finished flanges.

Several descriptions and illustrations have been presented to aid in understanding the present invention. A person of skill in the art will understand that there are many changes and variations that can be made without departing from the spirit of the invention. Each of these changes and variations is within the scope of the present invention.

What is claimed is:

1. A corner for an interior wall of a building, comprising:
   at least two drywall boards having edges that meet to form an unfinished corner;

a corner trim piece comprising an elongated, flexible, profiled and formed composite blend of materials having at least two flanges connected by a corner profile suitable for finishing the corner;

each of the flanges are bonded to one of the drywall boards covering respective edges thereof with the corner profile secured over the unfinished corner, wherein the flanges are continuously tapered from a thicker section adjacent to the corner profile to a thinner section at distal edges of the corner trim piece away from the corner profile; and wherein the composite blend of materials comprises a first polymer having a first melt temperature and a second polymer having a higher melt temperature than the first polymer, the composite blend also comprising a fibrous material such that the elongated, flexible, continuously extruded, profiled and formed composite blend of materials bonds with at least one of an adhesive, drywall compound, texture and paint.

2. The corner of claim 1, wherein the flanges are joined by a thin section of the composite blend of materials, and the composite blend of materials is continuously extruded.

3. The corner of claim 1, wherein a groove is cut or formed between the flanges.

4. The corner of claim 1, wherein the corner profile is bullnose.

5. The corner of claim 1, wherein the corner profile is sharp nose.

6. The corner of claim 1, wherein the composite blend comprises a blend of base polymers and a blend of fibrous materials.

7. The corner of claim 1, wherein the flanges comprise holes configured to increase a bond strength between the flanges and drywall.

8. A corner trim piece, comprising:

an elongated, flexible, profiled and formed composite blend of materials having at least two flanges connected by a corner profile suitable for finishing the corner;

wherein each of the flanges is continuously tapered from a thicker section adjacent to the corner profile to a thinner section at distal edges of the corner trim piece away from the corner profile; and wherein the composite blend of materials comprises a first polymer having a first melt temperature and a second polymer having a higher melt temperature than the first polymer, the composite blend also comprising a fibrous material such that the elongated, flexible, continuously extruded, profiled and formed composite blend of materials bonds with at least one of an adhesive, drywall compound, texture and paint.

* * * * *